April 2, 1963 P. DONGELMANS 3,083,468
MARKING DEVICE FOR APPARATUS FOR OBSERVING PHOTOGRAMS
Filed June 6, 1961
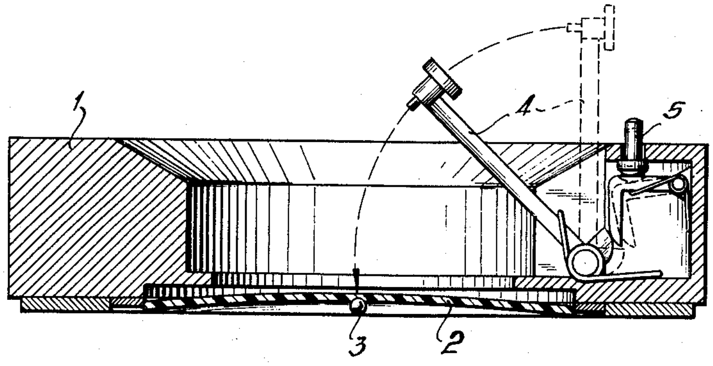
INVENTOR
PIETER DONGELMANS
By Burgess, Dinklage & Sprung
ATTORNEYS

United States Patent Office 3,083,468
Patented Apr. 2, 1963

3,083,468

MARKING DEVICE FOR APPARATUS FOR OBSERVING PHOTOGRAMS

Pieter Dongelmans, Delft, Netherlands, assignor to International Training Centre For Aerial Survey, a Dutch corporation Filed June 6, 1961, Ser. No. 115,136
6 Claims. (Cl. 33—189)

The present invention relates to a marking device for an apparatus for observing photograms while employing floating collimating marks.

For carrying out an aerotriangulation it is necessary to select transfer points in the coinciding parts of successive models or of the models relative to adjacent strips. Since natural, pointlike topographic marks are often not available in the photographs it is necessary to substitute artificial points. While the transfer points from one successive photograph to another of one strip of photographs are points which have to be marked only in a single picture, namely, in the central picture of two successive models, it is necessary that the points of connection to the adjacent strips always appear in two opposite pictures of the respective strips.

The transfer of such points is generally carried out in the following manner:

When observing the pictures stereoscopically, two similar collimating marks are adjusted in the respective parts of the pictures so as to merge in the topographic model into one spatial mark which seems to float free of parallax on the surface of the model. Thereafter it is necessary in a second operation to apply needle pricks or similar marks in the pictures at exactly those points where the collimating marks are located. This adjustment and marking has to be carried out as accurately as possible. While the degree of accuracy of this adjustment depends upon the visual ability of the observer to observe stereoscopically, the second operation of the accurate marking of the adjusted points constitutes a purely technical problem.

It is an object of the present invention to provide a device for carrying out this accurate marking operation.

According to the invention, this device consists of a mark carrier which is at least partly movable in a direction toward the picture surface and is provided with a collimating mark which itself forms a marking tool, for example, an embossing die.

The mark carrier preferably consists of a transparent disk, for example, of transparent plastic, which is framed in a metal ring and on which an adjusting mark is located. The adjustment of a desired point by means of the mark may be carried out either by shifting the entire apparatus free-hand on the picture upon which it is placed or by accurately adjusting the disk of transparent plastic carrying the adjusting mark by means of setscrews. The collimating mark consists of a small metal ball which is fitted into the transparent plastic so as to project slightly from the lower surface of the transparent disk and will rest directly on the picture. By exerting a pressure or impact upon the upper side of the transparent disk, the projecting part of the metal ball will be impressed into the photographic emulsion and will thus produce a circular mark in the picture. By guiding the mark carrier in the vertical direction, the force exerted upon the metal ball will be properly directed. The adjusting mark thus also forms the marking tool. This insures that there will be no deviation in position between the adjusting mark and the embossed marking point.

The features and advantages of the present invention will become more clearly apparent from the following description of one preferred embodiment as illustrated diagrammatically in the accompanying drawing.

In this drawing, a metal ring 1 carries a disk 2 of transparent plastic which is flexibly mounted therein. At the center of disk 2, a steel ball 3 is mounted within an aperture so as to project slightly from the lower side of the disk. When the device is placed upon a picture to be marked, ball 3 will almost touch the surface of the picture. When the desired position for the mark has been selected, the spring-loaded hammer 4 is released by a button 5 and will then hit upon ball 3 from above so that the latter will produce a circular mark in the photographic emulsion.

Although not particularly shown in the drawing, it is advisable to mount disk 2 so as to be accurately adjustable to a limited extent in a direction parallel to the picture surface. Such an adjustment may be carried out by means of setscrews.

Although my invention has been illustrated and described with reference to the preferred embodiment thereof, I wish to have it understood that it is in no way limited to the details of such embodiment, but is capable of numerous modifications within the scope of the appended claims.

Having thus fully disclosed my invention, what I claim is:

1. A marking device for use in observing photograms which comprises:
   (*a*) a frame for resting on the photogram,
   (*b*) a transparent plate mounted in said frame for overlying the area to be observed,
   (*c*) a marker mounted on the underside of said plate; the plate being positioned in said frame so that the marker will be normally closely spaced from the photogram, said plate being movable with respect to the frame to lower the marker into marking engagement with the photogram and return to its normal position.

2. A marking device according to claim 1, said marker being visible through the transparent plate and serving as an adjusting mark whereby the desired position of the marking device can be selected by observing the photogram and the marker and moving the device over the photogram to the position desired.

3. A marking device according to claim 1, said marker being a ball projecting from the upper side of the transparent plate.

4. A marking device according to claim 3, said ball being mounted in an aperture in the underside of said plate.

5. A marking device according to claim 1, and comprising a hammer pivotably mounted on said frame and adapted to be propelled downwardly so as to hit the plate over said marker.

6. A marking device according to claim 5, comprising spring means for propelling the hammer downwardly as aforesaid, holding means for securing the hammer in a position wherein the spring is loaded to propel the hammer downwardly, and means for releasing the holding means for the downward propulsion of the hammer by the spring.

References Cited in the file of this patent

UNITED STATES PATENTS

| | | |
|---|---|---|
| 1,962,216 | Schiffl | June 12, 1934 |
| 2,208,435 | Simpson | July 16, 1940 |
| 2,364,497 | Wahnish et al. | Dec. 5, 1944 |
| 2,414,895 | Reynolds | Jan. 28, 1947 |
| 2,450,656 | Gowland | Oct. 5, 1948 |
| 2,859,659 | Fenske et al. | Nov. 11, 1958 |
| 2,887,353 | Barstrom et al. | May 19, 1959 |